Figure 1:
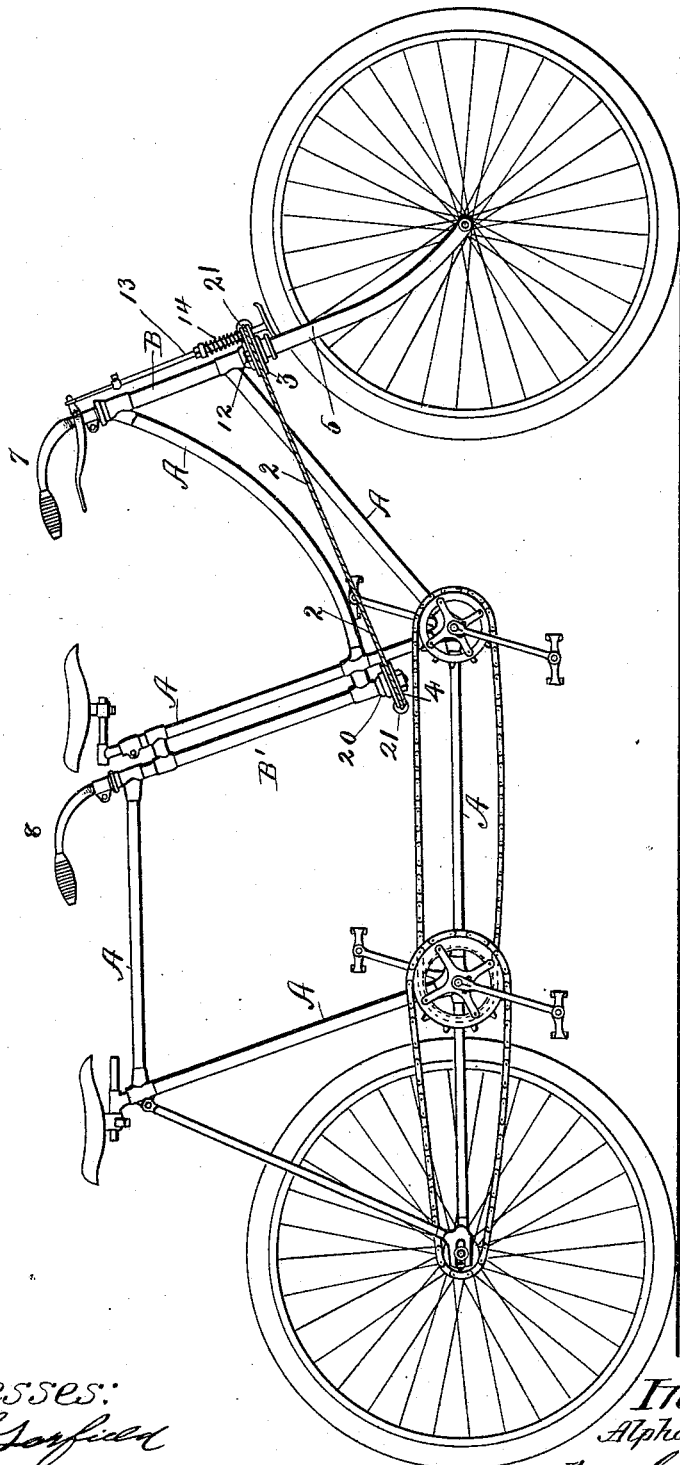

(No Model.)
2 Sheets—Sheet 1.

A. O. VERY.
TANDEM BICYCLE STEERING DEVICE.

No. 585,139.          Patented June 22, 1897.

Witnesses:
J. D. Garfield
K. D. Clemons

Inventor:
Alpha O. Very,
by Chapin & Lee
Attorneys.

(No Model.) 2 Sheets—Sheet 2.
A. O. VERY.
TANDEM BICYCLE STEERING DEVICE.
No. 585,139. Patented June 22, 1897.
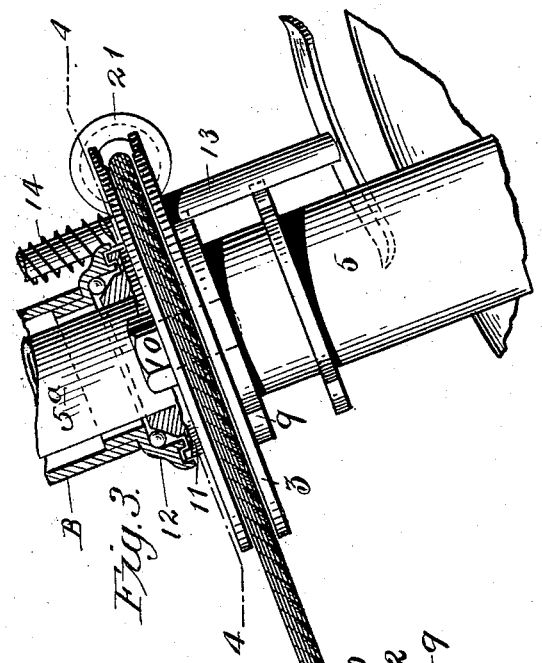
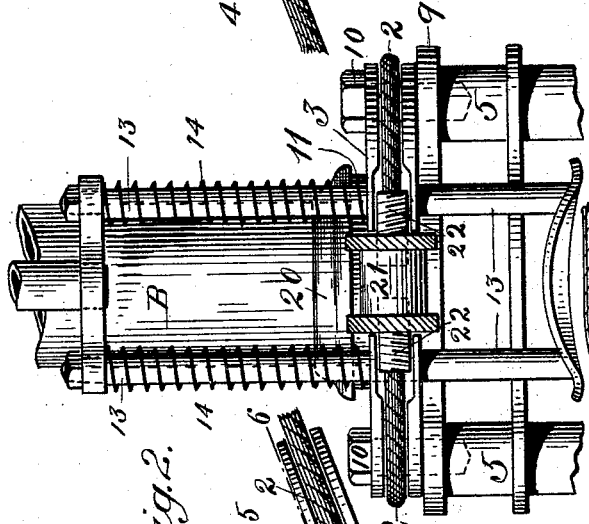
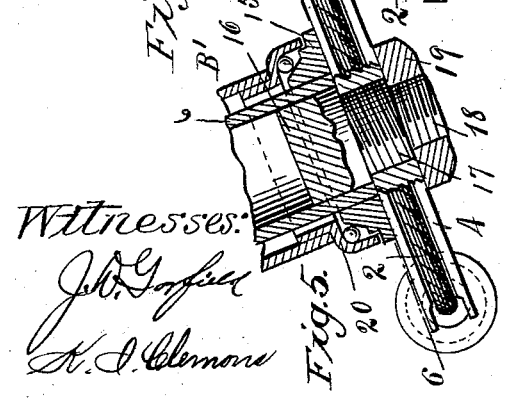
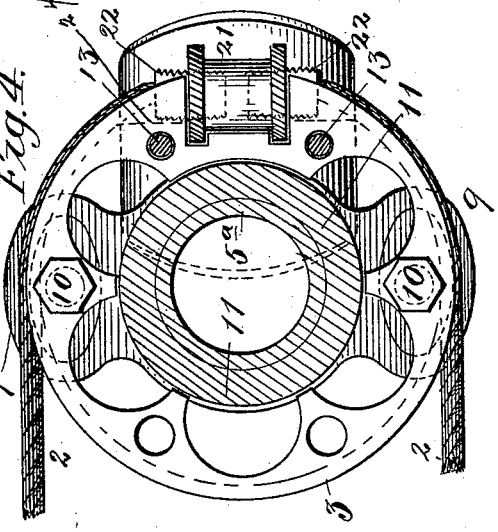
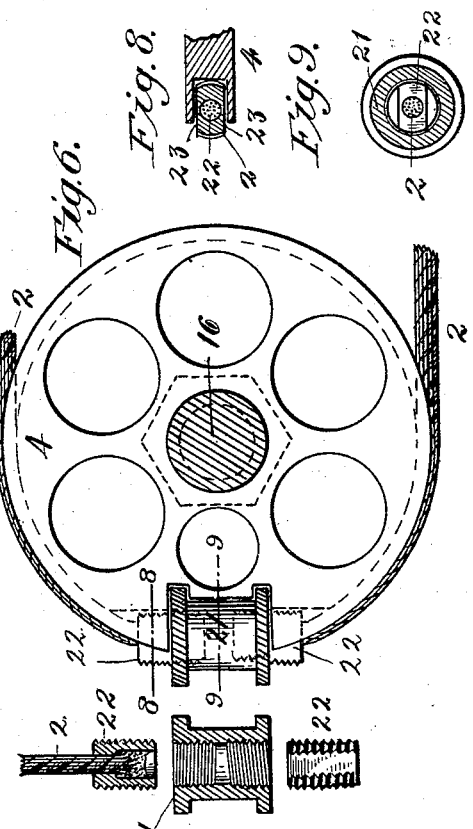
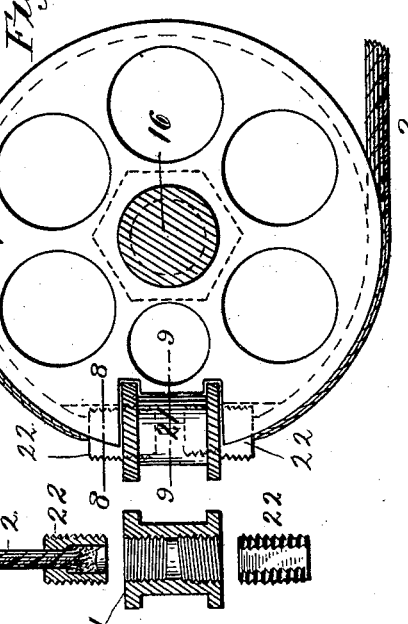
Witnesses:
Inventor:
Alpha O. Very.
By Chapin & Lee
Attorneys.

UNITED STATES PATENT OFFICE.

ALPHA O. VERY, OF SPRINGFIELD, MASSACHUSETTS.

TANDEM-BICYCLE STEERING DEVICE.

SPECIFICATION forming part of Letters Patent No. 585,139, dated June 22, 1897.

Application filed May 4, 1896. Serial No. 590,085. (No model.)

*To all whom it may concern:*

Be it known that I, ALPHA O. VERY, a citizen of the United States of America, residing at Springfield, in the county of Hampden and State of Massachusetts, have invented new and useful Improvements in Tandem-Bicycle Steering Devices, of which the following is a specification.

This invention relates to steering devices for tandem bicycles, and has for its object the adaptation of a flexible connection between the two heads of the machine which receive the handle-bar posts, which connections may be tightened or loosened, as desired, and by which the two handle-bars may be adjusted the one relative to the other; and the invention consists in the arrangement and construction hereinafter described and claimed.

In the drawings forming part of this specification, Figure 1 is a side elevation of a tandem bicycle having the steering devices thereon constructed according to my invention. Fig. 2 is an enlarged front elevation of a portion of the steering device attached to the front fork of the bicycle. Fig. 3 is a side elevation, partly in section, of the parts shown in Fig. 2. Fig. 4 is a sectional plan view on line 4 4, Fig. 3. Fig. 5 is a side elevation, partly in section, of parts of the second steering-head. Fig. 6 is a plan view of parts on said second steering-head, partly in section, taken on line 6 6, Fig. 5. Fig. 7 shows details of construction of devices for adjusting the flexible connections between the steering-heads of the machine. Fig. 8 is a sectional view of the parts shown in Fig. 6, taken on line 8 8, Fig. 6. Fig. 9 is a sectional view of parts shown in Fig. 6, taken on line 9 9 of said figure.

Referring to the drawings, A is the frame of a tandem bicycle of a usual form of construction having thereon the two steering-heads B and B'. Said two heads are united by a flexible connection 2, engaging with two grooved pulleys 3 and 4, one secured to the front fork 5 and the other secured to the lower end of the tube 6, (see Fig. 5,) within the head B' of the frame A. Secured to the upper ends of the front-fork tube 5ᵃ is the handle-bar 7, and in a like position on the tube 6 is the handle-bar 8. The said pulley 3 is secured to the upper crown-plate 9 of the front fork by two screws 10, as shown in Figs. 2, 3, and 4, the center of the said pulley being cut away in such manner as to cause it to fit closely the annular base of the ball-cone 11, which is brazed onto the base of the front-fork tube 5ᵃ, the ball-case 12 being brazed into the base of the head B, and in the usual manner the balls being inclosed between said cone and case. The said pulley 4 is suitably perforated for the brake-rods 13 13, which pass freely therethrough and which are thereby afforded a rigid support close to the brake-shoe. The brake-lever to which the brake-rods are secured being attached pivotally to the handle-bar, it follows that the entire brake will be swung in unison with the movements of the front fork 5 and its wheel. A retracting-spring 14 is provided, against the action of which the said brake is applied.

On the lower end of the tube 6 of the head B' is secured in any suitable manner a ball-cone 15, and within the open lower end thereof is fixed a plug 16, a portion of which projects outwardly therefrom and is made of two diameters which are oppositely threaded, as at 17 18. Onto the larger one, 17, of said two diameters the grooved pulley 4 is screwed, and a check-nut 19 on the said smaller diameter serves to secure said pulley 4 thereon.

Into the base of the head B' is secured a ball-case 20 to receive the balls, the construction being that usually employed in bicycles. As aforesaid, the said two grooved pulleys are united by flexible connections, whereby the movements of the two handle-bars 7 and 8 are made synchronous. The said connection is preferably a wire rope, as 2, in two parts, one end of each of them being secured in an adjusting device on each of the said grooved pulleys 3 and 4, and by means of which either one or both of said two parts of said flexible connection may be shortened or lengthened at will. Any other suitable flexible connection may be used instead of the wire rope, but the latter is preferred. Said adjusting devices consist of a barrel 21, centrally perforated and threaded in opposite directions from each end to the center thereof for the reception of the suitably-threaded plugs 22 22. Each of said plugs has a hole bored therethrough for the reception of the end of the wire rope 2, which is secured therein by soldering, or in any other suitable manner. Said plugs 22 are provided with two oppositely-located flattened faces 23. The said adjusting devices are applied to the grooved pulleys 3 and 4, as shown clearly in Figs. 4 and 6, viz: The said wheels are cut away to receive the said barrel 21, a straight slot being cut parallel with the axis of said barrel 21 and indicated by the dotted line 24 on said pulleys 3 and 4, said slot being of slightly greater width than the thickness of the plugs 22 between the flat faces 23 thereof, and within which slot the said flattened plugs are located when the adjusting devices are in proper position in said pulleys 3 and 4, the relation of one of said plugs to said slot being shown in Fig. 8. The purpose of this construction is to rigidly hold the ends of the said plugs 22 which project beyond the ends of the barrel 21 against rotation, to the end that the barrel of either pulley may be turned to tighten or loosen the flexible rope connection 2 between the pulleys 3 and 4. One or both of the said barrels 21 may be turned to effect the said adjustment. In order to vary the relation of one of the said handle-bars 7 or 8 to the other, one of the plugs 22 of either one of said pulleys 3 and 4 can be entered into the end of the said barrel more or less before the other plug is inserted into the opposite end thereof and thereby one of said two parts of the connection 2 be shortened to a greater or less extent than the other, as may be desired, and the two handle-bars be adjusted the one to the other.

Having thus described my invention, what I claim, and desire to secure by Letters Patent, is—

1. In a tandem bicycle, steering devices consisting of two steering-heads, a handle-bar and a grooved pulley secured to each of said heads, means of connection between said pulleys consisting of two flexible parts, screw-threaded plugs secured to the ends of said parts, suitably-threaded nuts to receive said plugs, and recesses in the periphery of said grooved pulleys for receiving said nut and plug, substantially as described.

2. In a tandem-bicycle steering device, two steering-heads, handle-bars secured to each of them and flexible connections engaging said two heads consisting of two lengths of wire rope 2, 2, two grooved pulleys 3 and 4, for engagement with said wire rope and adjusting devices for said flexible connections consisting of the right and left hand threaded plugs 22, 22, non-rotatably supported in said pulleys, and the nuts 21, into each end of which one of said plugs is screwed, said nuts being rotatably supported on said pulleys, substantially as described.

ALPHA O. VERY.

Witnesses:
WM. H. CHAPIN,
H. A. CHAPIN.